C. B. MANSBACH.
TIRE TOOL.
APPLICATION FILED JUNE 19, 1916.
1,220,659. Patented Mar. 27, 1917.
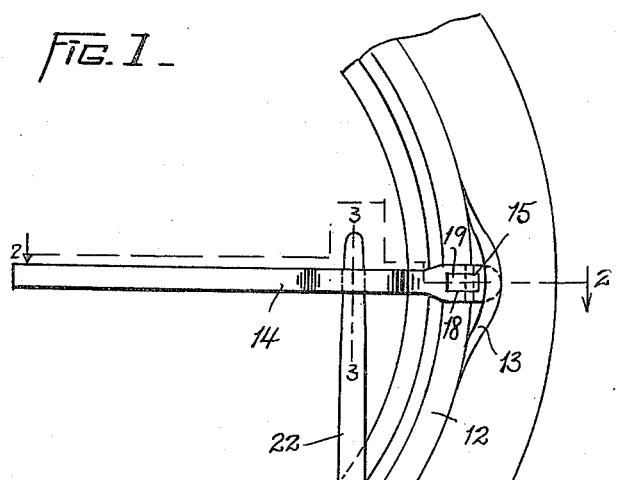
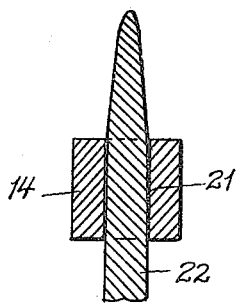
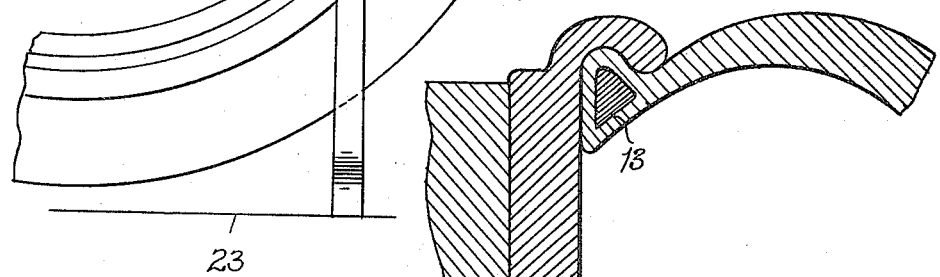
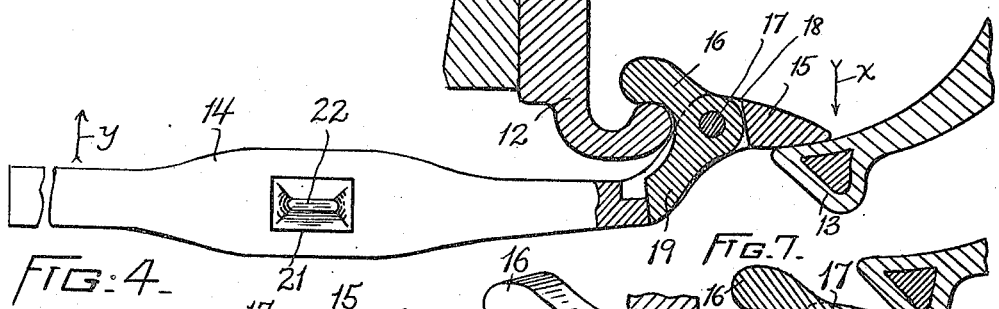
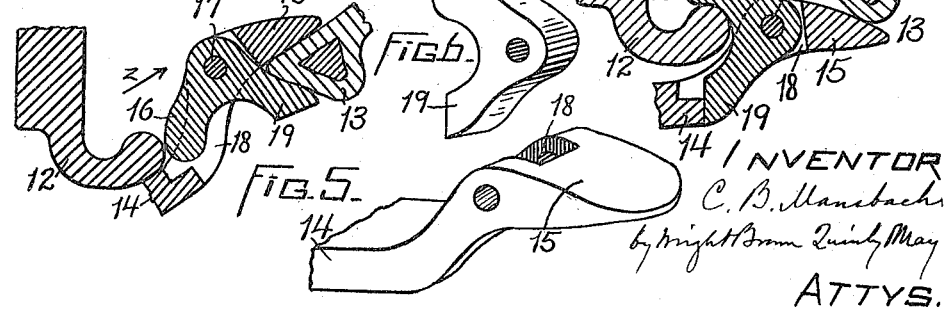
INVENTOR
C. B. Mansbach
by Wright Brown Quinby May
ATTYS.

UNITED STATES PATENT OFFICE.

CONRAD B. MANSBACH, OF BROCKTON, MASSACHUSETTS, ASSIGNOR OF ONE-THIRD TO FRANK L. PRICE AND ONE-THIRD TO FRANK A. CARLSON, OF BROCKTON, MASSACHUSETTS.

TIRE-TOOL.

1,220,659.  Specification of Letters Patent.  Patented Mar. 27, 1917.

Application filed June 19, 1916. Serial No. 104,374.

*To all whom it may concern:*

Be it known that I, CONRAD B. MANSBACH, a citizen of the United States, residing at Brockton, in the county of Plymouth and State of Massachusetts, have invented new and useful Improvements in Tire-Tools, of which the following is a specification.

This invention relates to tools for manipulating a tire shoe engaged with a flanged wheel rim, the feat accomplished by the manipulation being the detachment of one edge of the shoe from the corresponding flange of the rim, to permit the insertion and removal of an inner tube.

The invention has for its object to provide a simple and effective tool for this purpose, and is embodied in the improvements hereinafter described and claimed.

Of the accompanying drawings forming a part of this specification:

Figure 1 represents a side view of a portion of a wheel rim, a tire shoe thereon, and a tool embodying the invention engaged with the rim and shoe;

Fig. 2 represents a section on line 2—2 of Fig. 1;

Fig. 3 represents a section on line 3—3 of Fig. 1;

Fig. 4 represents a fragmentary sectional view illustrating the operation of inserting the tool between the wheel rim and shoe;

Figs. 5 and 6 represent perspective views showing portions of the tool disconnected;

Fig. 7 represents a fragmentary view similar to a portion of Fig. 2, illustrating the use of the tool in replacing a displaced shoe edge.

The same reference characters indicate the same or similar parts in all the views.

In the drawings, 12 represents a flanged wheel rim of ordinary form, the flanges of the rim being adapted to engage the edge portions 13 of a tire shoe, which when in use contains the usual inflated inner tube.

14 represents a handspike, which is an elongated bar preferably of metal, having a terminal 15 offset from the body portion of the handspike and formed to be inserted between a flange of the rim 12 and one of the edge portions of the shoe.

16 represents a hooked lug pivoted at 17 in a slot 18 formed in the terminal 15, said lug being formed to engage one of the rim flanges, as indicated by Fig. 2.

The lug 16 is provided with an arm 19 constituting a stop member adapted to abut against a complemental stop member formed by one end of the slot 18, said lug when engaged with the rim flange confining the terminal 15 against movement in the direction of the arrow *x* from the position shown by Fig. 2, excepting such movement as may be due to movement of the opposite end of the handspike in the direction indicated by the arrow *y*.

The lug 16 is adapted to be swung into the slot 18, as indicated by Fig. 4, to facilitate the insertion of the terminal 15 and the lug between the rim flange and a displaced portion of one of the shoe edges 13.

When the lug and rim are in the position shown by Fig. 4, the arm 19 projects from the slot in position to abut against the displaced shoe edge 13, so that when the handspike is moved in the direction of the arrow *z* in Fig. 4, the pressure of the arm 19 against the shoe edge will cause the lug 16 to swing out of the slot 18 and to engage the rim flange, as shown by Fig. 2.

The handspike 14 is provided with a socket 21 between its ends and relatively near the terminal 15.

22 represents a strut, which is removably inserted in the socket 21 and is adapted to bear on a supporting base 23, such as a floor or the ground, under a jacked-up wheel, as indicated by Fig. 1, that portion of the strut which is inserted in the socket being tapered, as indicated by Figs. 1 and 3, or otherwise formed to prevent downward movement of the handspike upon the strut.

The upper end of the strut 22, being reduced and tapered, is adapted to serve as a prying tool to effect the initial displacement of one of the shoe edges.

The operation of the tool is as follows:

The wheel being jacked up and free to rotate, a portion of one of the shoe edges is initially displaced, preferably by the strut 22. The terminal 15 and lug 16 are then inserted between the rim flange and the displaced portion of the shoe edge, as indicated by Fig. 4, the lug being displaced from its rim-flange-engaging position until the endwise movement of the handspike carries the lug past the rim flange, whereupon the lug is swung out of the slot 18 and is in position to engage the rim flange, the handspike being suitably manipulated to cause such engagement. The strut 22 is now engaged with the handspike and with the supporting base, so that the handspike is supported in a substantially horizontal position. The operator, grasping the end portion of the handspike opposite the terminal 15 with one hand, holds the handspike and causes said terminal to exert a displacing pressure on the shoe edge against which it bears. The operator now by rotating the wheel causes the terminal 15 to progressively displace the shoe edge until it is entirely disconnected from the corresponding rim flange, so that an inner tube may be inserted or removed.

The displaced shoe edge may be replaced by springing a portion of it inwardly and causing it to bear on the inner side of the terminal 15, as shown by Fig. 7, and again rotating the jacked-up wheel. The shoe edge now slides inwardly to place on the terminal 15 and lug 16, these parts guiding the shoe edge inwardly until it is in position to spring into engagement with the corresponding rim flange.

After the work of the tool has been accomplished, the strut is disconnected from the handspike, so that the two parts may be readily packed in a tool box.

I do not limit myself to the specific embodiment of my improvements shown by the drawings, except as otherwise required in certain of the more limited claims appended hereto.

Having described my invention, I claim:

1. A tire tool comprising a handspike one end of which is tapered, and a member constituting a lug and an arm having angular relation to each other, said member being pivoted substantially midway of its length to the handspike, adjacent said tapered end, a portion of said pivoted member being arranged to abut against a portion of said handspike to limit oscillation of said pivoted member and said handspike relatively to each other.

2. A tire tool comprising a handspike one end of which is tapered, and a member pivoted to said handspike, near said end, said pivoted member constituting a lug and an arm having angular relation to each other, the arm of said pivoted member being arranged to contact with two spaced-apart portions of said handspike to limit oscillation of the pivoted member and the handspike, relatively to each other, in opposite directions.

3. A tire tool comprising a handspike one end of which is tapered, and a member pivoted to said handspike, near said end, said pivoted member constituting a lug and an arm having angular relation to each other, the arm of said pivoted member being arranged to coact with the tapered end of said handspike to form a pair of jaws arranged to receive between them the bead of a tire shoe, said arm and handspike each having a portion arranged to abut a portion of the other to limit closing movement of said jaws.

4. A tire tool comprising a handspike one end of which is tapered, and a member pivoted to said handspike, near said end, said pivoted member constituting a lug and an arm having angular relation to each other, the arm of said pivoted member being arranged to coact with the tapered end of said handspike to form a pair of jaws arranged to receive between them the bead of a tire shoe when the handspike is inserted between such bead and a rim flange, said lug having a portion arranged to be engaged by such rim to limit opening movement of said jaws.

5. A tire tool comprising a handspike having an offset portion the free end of which is tapered, and a member pivoted to said handspike, near said end, said pivoted member constituting a lug and an arm having angular relation to each other, said lug having a concave portion arranged to engage a member capable of acting as a fulcrum, and said arm having a portion arranged to abut said handspike so that the handspike and lug may be moved angularly, in unison, about such fulcrum member.

6. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of said slot, the arm of said pivoted member being arranged to contact with a portion of said handspike to limit oscillation of said pivoted member and said handspike relatively to each other.

7. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of the slot, the arm of said pivoted member being arranged to contact with portions of said handspike to limit oscillation of the pivoted member and the handspike, relatively to each other, in both directions.

8. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of the slot, the arm of said pivoted member being arranged to coact with the tapered end of said handspike to form a pair of jaws arranged to receive between them the bead of a tire when the lug of said pivoted member is within said slot.

9. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of the slot, the arm of said pivoted member being arranged to coact with the tapered end of said handspike to form a pair of jaws arranged to receive between them the bead of a tire when the lug of said pivoted member is within said slot, said arm and handspike having portions arranged to abut each other to limit closing movement of said jaws.

10. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of the slot, the arm of said pivoted member being arranged to coact with the tapered end of said handspike to form a pair of jaws arranged to receive between them the bead of a tire when the lug of said pivoted member is within said slot, said arm and handspike having portions arranged to abut each other to limit closing movement of said jaws, said lug having its outermost edge projecting from said slot so as to be capable of coöperation with a body contacting therewith to limit opening movement of said jaws.

11. A tire tool comprising a handspike having an offset portion the free end of which is tapered, said offset portion being slotted, and a member pivoted in said slot and constituting a lug and an arm having angular relation to each other, the arm of said pivoted member being movable out of one end of the slot, and the lug of said pivoted member being movable out of the other end of the slot, the lug of said pivoted member having its inner edge concaved so as to be mounted on a member capable of acting as a fulcrum, and the arm of said pivoted member having an end portion arranged to abut against said handspike so that angular movement of said handspike about such fulcrum member in one direction is transmitted positively to the lug.

12. A tire tool comprising a handspike one end of which is tapered, a member pivoted to said handspike, near said end, said pivoted member constituting a lug and an arm having angular relation to each other, the arm of said pivoted member being arranged to contact with two spaced-apart portions of said handspike to limit oscillation of the pivoted member and the handspike, relatively to each other, in opposite directions, said handspike being provided with a socket, and a strut having a tapered end arranged to enter said socket.

13. A tire tool comprising a handspike one end portion of which is offset and tapered, and an angular member constituting a hooked lug and an arm, said angular member arranged in a slot in the offset portion of said handspike so as to be capable of movement relatively to said handspike, portions of said angular member being arranged to abut against said handspike to limit relative movement between the handspike and angular member.

14. A tire tool comprising a handspike one end portion of which is offset and tapered, and an angular member constituting a hooked lug and an arm, said angular member being arranged in a slot in the offset portion of said handspike so as to be capable of movement relatively to said handspike, portions of said angular member being arranged to abut against said handspike to limit relative movement between the handspike and angular member, said handspike having a strut-receiving socket, and a strut having a tapered end arranged to enter said socket and to hold the handspike in substantially perpendicular relation to the strut.

In testimony whereof I have affixed my signature.

CONRAD B. MANSBACH.

Copies of this patent may be obtained for five cents each, by addressing the "Commissioner of Patents, Washington, D. C."